US009052793B2

(12) United States Patent  
Torngren

(10) Patent No.: US 9,052,793 B2  
(45) Date of Patent: Jun. 9, 2015

(54) LIGHTWEIGHT OBSERVABLE VALUES FOR MULTIPLE GRIDS

(71) Applicant: International Business Machines Corporation, Armonk, NY (US)

(72) Inventor: Peer M. Torngren, Sollentuna (SE)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 13/719,622

(22) Filed: Dec. 19, 2012

(65) Prior Publication Data

US 2014/0173219 A1    Jun. 19, 2014

(51) Int. Cl.
| | |
|---|---|
| G06F 12/00 | (2006.01) |
| G06F 13/00 | (2006.01) |
| G06F 13/28 | (2006.01) |
| G06F 9/44 | (2006.01) |
| G06F 3/048 | (2013.01) |
| G06F 9/54 | (2006.01) |
| G06F 17/30 | (2006.01) |

(52) U.S. Cl.
CPC .............. *G06F 3/048* (2013.01); *G06F 9/542* (2013.01); *Y10S 707/99944* (2013.01); *G06F 9/4425* (2013.01); *G06F 17/30368* (2013.01)

(58) Field of Classification Search
CPC . G06F 17/30368; G06F 9/4425; G06F 9/542; Y10S 707/99944
USPC .......................................... 711/141; 717/116
See application file for complete search history.

(56) References Cited

U.S. PATENT DOCUMENTS

| 8,276,119 | B2* | 9/2012 | El-Kersh ..................... 717/116 |
| 2002/0111992 | A1 | 8/2002 | Copeland et al. |
| 2003/0204517 | A1* | 10/2003 | Skinner et al. ............... 707/100 |
| 2005/0027549 | A1* | 2/2005 | Chen et al. ...................... 705/1 |
| 2005/0091637 | A1 | 4/2005 | Schechter et al. |
| 2011/0214092 | A1* | 9/2011 | Palmer et al. ................. 715/863 |
| 2012/0167067 | A1 | 6/2012 | Low et al. |

OTHER PUBLICATIONS

Kielmann et al., "Enabling Java for High-Performance Computing: Exploiting Distributed Shared Memory and Remote Method Invocation" Communications of the ACM vol. 44 Issue 10, Oct. 2001, pp. 110-117 [online], [retrieved on Sep. 5, 2012]. Retrieved from the Internet <URL: http://www.few.vu.nl/~t.kielmann/papers/cacm.pdf>.

(Continued)

*Primary Examiner* — Ryan Bertram  
(74) *Attorney, Agent, or Firm* — Edward P. Li

(57) ABSTRACT

A method, computer program product, and computer system for updating observable values for multiple user-interface components. A computer system reads first values indexed by keys from a cache, in response to receiving a request from the multiple user-interface components. The computer system reads second values, which are indexed by the keys, from persistent storage. The computer system compares the first values and the second values based on the keys. The computer system writes the second values as new values of the first values in the cache. The computer system notifies one or more observers for respective ones of the first values, wherein the respective ones of the first values are changed. And, the computer system notifies the one or more observers for the first values that reading and writing operations are finished.

20 Claims, 4 Drawing Sheets

(56) References Cited

OTHER PUBLICATIONS

Telerik Inc., "ObservableObject in Kendo UI MVVM framework | Kendo UI Documentation" Copyright 2011-2012 [online], [retrieved on Sep. 5, 2012]. Retrieved from the Internet <URL: http://www.kendoui.com/documentation/framework/mvvm/observableobject.aspx>.

Wikipedia, "Flyweight pattern—Wikipedia, the free encyclopedia", Published on: Mar. 16, 2012, Wikipedia, the free encyclopedia [online], [retrieved on Oct. 10, 2012]. Retrieved from the Internet <URL: http://en.wikipedia.org/w/index.php?title=Flyweight_pattern&oldid=482203222>.

Wikipedia, "Observer pattern—Wikipedia, the free encyclopedia", Published on: Apr. 11, 2012, Wikipedia, the free encyclopedia [online], [retrieved on Oct. 10, 2012]. Retrieved from the Internet <URL: http://en.wikipedia.org/w/index.php?title=Observer_pattern&oldid=486825251>.

\* cited by examiner

LIGHTWEIGHT OBSERVABLE VALUES FOR MULTIPLE GRIDS

FIELD OF THE INVENTION

The present invention relates generally to updating observable values for multiple user-interface components, and more particularly to a lightweight mechanism of updating the observable values.

BACKGROUND

There are a few ways to handle updating observable values when multiple user-interface components (e.g. grids) show the simple or native data. The first way is a flyweight pattern. A flyweight is an object that minimizes memory use by sharing as much data as possible with other similar objects; it is a way to use objects in large numbers when a simple repeated representation uses an unacceptable amount of memory. Often some parts of the object state can be shared and it's common to put them in external data structures and pass them to the flyweight objects temporarily when they are used. The second way is an observer pattern. An object called the subject maintains a list of its dependents called observers. The object notifies observers automatically of any state changes, usually by calling one of their methods. The observer is a key part in the MVC (Model-View-Controller) pattern. The third way is an observable wrapper. The observable wrapper combines the first and second ways. By wrapping a native object in an observable container that exposes getters and setters according to Java Beans standards, changes of the native type may be observed. But, the third way is a rather expensive way.

SUMMARY

Embodiments of the present invention provide a method, computer program product, and computer system for updating observable values for multiple user-interface components. A computer system, in response to receiving a request from the multiple user-interface components, reads first values from a cache, wherein the first values are indexed by keys. The computer system reads second values from persistent storage, wherein the second values are indexed by the keys. The computer system compares the first values and the second values based on the keys. The computer system writes to the cache the second values as new values of the first values. The computer system notifies one or more observers for respective ones of the first values, wherein the respective ones of the first values are changed. And, the computer system notifies the one or more observers for the first values that reading and writing operations are finished.

DETAILED DESCRIPTION

Figure 1:
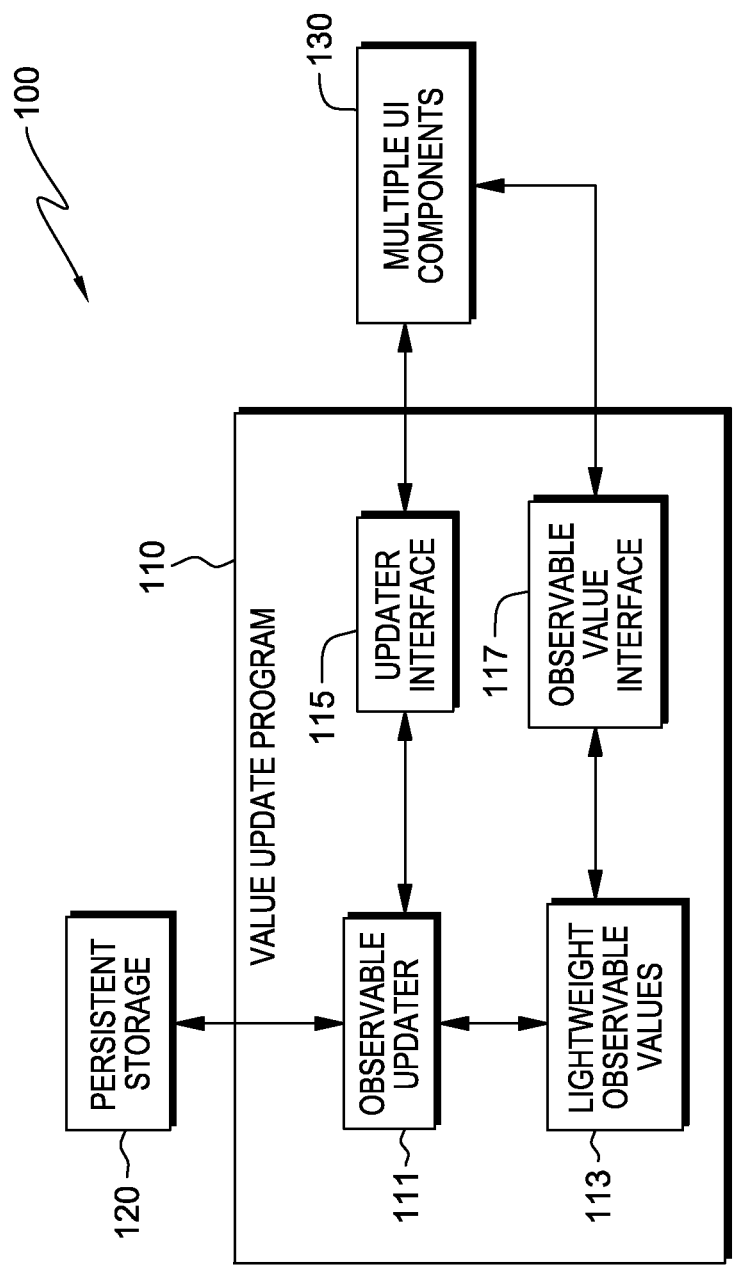
FIG. 1 is a diagram illustrating a system for updating observable values for multiple user-interface components, in accordance with an exemplary embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Please note that in the drawings and descriptions below, the term "Observer" in the general Observer pattern is replaced by the term "Listener". The Observer pattern is very common in the Java community. However, the implementation of an Observer is often called a Listener, and related methods to add and remove observers follow the same naming conventions. In the text below, the terms Observable and Listener refer to exactly the same concept and can be used interchangeably. The diagrams and descriptions use the term Listener, since this reflects the Java naming conventions and the exemplary embodiment.

FIG. 1 is a diagram illustrating updating observable values system 100 for multiple user-interface components 130, in accordance with an exemplary embodiment of the present invention. Updating observable values system 100 includes value update program 110, persistent storage 120, and multiple user-interface (UI) components 130. For example, multiple UI components 130 are multiple grid cells. Value update program 110 includes observable updater 111, lightweight observable values 113, updater interface 115, and observable value interface 117. Observable updater 111 manages updates of lightweight observable values 113 and maintains a cache of lightweight observable values 113. Each of lightweight observable values 113 wraps a native value (e.g. an int). When the native value of a specific one of lightweight observable values 113 is loaded from persistent storage 120 or is updated based on a value from persistent storage 120, observable updater 111 sets a new value for the specific one of lightweight observable values 113. Value update program 110 gives interested parties (e.g. grids showing the cached values) two options to listen to changes of the lightweight observable values 113: first, listening to changes of individual values; second, listening to the read/write events and fetching all interesting values (e.g. the cached values shown in grids) in one call when observable updater 111 has made value changes.

In the first option, the changes of the individual values are respectively notified to multiple UI components 130. If a native value of a specific one of lightweight observable values 113 is updated, all listeners of the specific one of lightweight observable values 113 are notified. Specific one or more of multiple user-interface components 130 show the native value; thus, the specific one or more of multiple user-interface components 130 are notified by lightweight observable values 113 through observable values interface 117 thereof. In the second option, notification of changes of massive native values is handled in one go rather than one by one native value. The notification of the changes of massive native values is implemented by observable updater 111 through updater interface 115 thereof. These two options enable listeners to choose a best way to monitor the changes of the native values: one call for one native value change or one call for changes of many native values. The best way depends on the runtime context, nature of data, and how frequently data are changed.

Figure 2:
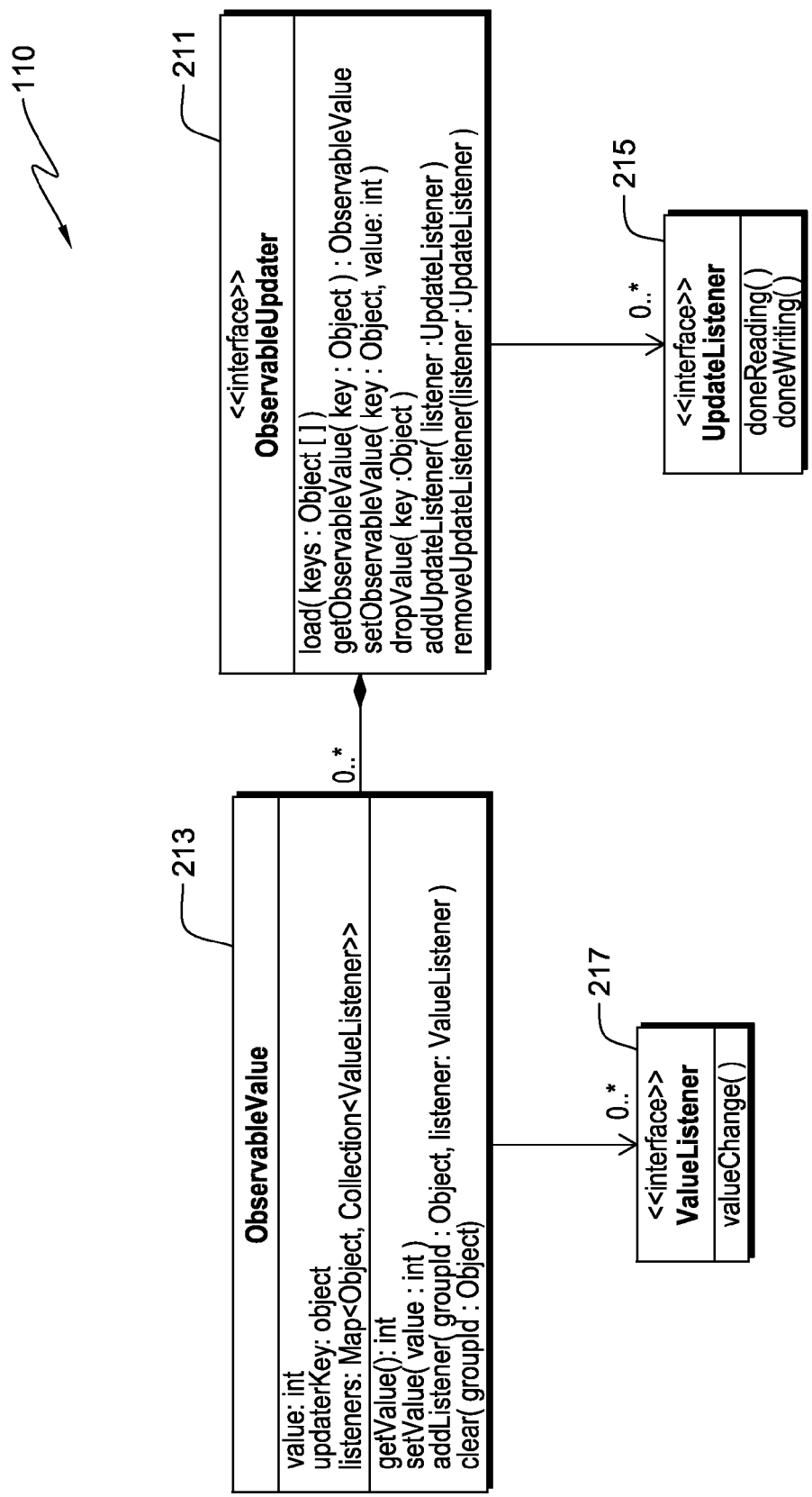
FIG. 2 is a class diagram of a value update program in the system shown in FIG. 1, in accordance with an exemplary embodiment of the present invention.

FIG. 2 is a class diagram of value update program 110 in updating observable values system 100 shown in FIG. 1, in accordance with an exemplary embodiment of the present invention. Value update program 110 includes classes: ObservableUpdater 211, ObservableValue 213, UpdateListener 215, and ValueListener 217. In this exemplary embodiment, ObservableUpdater 211 includes methods of observable updater 111 shown in FIG. 1, ObservableValue 213 includes attributes and methods of a specific one of lightweight observable values 113 shown in FIG. 1. FIG. 2 shows that ObservableUpdater 211 and ObservableValue 213 have a composition relationship and ObservableUpdater 211 associates with multiple instances of ObservableValue 213. In this exemplary embodiment, UpdateListener 215 includes methods of updater interface 115, and ValueListener 217 includes a method of observable values interface 117. As shown in FIG. 2, ObservableUpdater 211 calls multiple instances of UpdateListener 215 and ObservableValue 213 calls multiple instances of ValueListener 217.

Referring to FIG. 2, load( ) in ObservableUpdater 211 reads values from persistent storage 120 (e.g. a database) shown in FIG. 1. The values are indexed by keys. In ObservableUpdater 211, getObservableValue( ) is, according to Java Bean standard, a standard getter that reads a value from an internal cache of ObservableUpdater 211 and returns ObservableValue 213. In ObservableUpdater 211, setObservableValue( ) is, according to Java Bean standard, a standard setter that writes a value to an internal cache of ObservableUpdater 211. In ObservableUpdater 211, addUpdateListener( ) enables registered listeners to listen to the read/write events and fetch all interesting values (e.g. the cached values shown in grids) in one call. When new or updated values have been read into the internal cache, ObservableUpdater 211 calls doneReading( ) in UpdateListener 215. This is a way how ObservableUpdater 211 broadcasts reading events to registered listeners. When new or updated values have been written to persistent storage, ObservableUpdater 211 calls doneWriting( ) in UpdateListener 215. This is a way how ObservableUpdater 211 broadcasts writing events to registered listeners. In ObservableUpdater 211, removeUpdateListener( ) removes a registered listener when the listener itself requests to be removed. When the last listener for the value is removed, the value can be removed from the internal cache. The removal of the value from the cache can be done explicitly by dropValue( ) in ObservableUpdater 211, or it can be done implicitly by using a WeakHashMap in ObservableUpdater 211.

In the exemplary embodiment shown in FIG. 2, a list of observers for each value is a simple and lightweight collection of listeners, thus implementing a very simple interface: valueChange( ) in ValueListener 217. Whenever ObservableUpdater 211 writes a new value to the internal cache, ObservableValue 213 makes a simple check to see if the native value in the internal cache has changed. If the native value has changed, all registered listeners are notified that the native value has changed, and can take relevant actions (typically to update the presentation in a grid cell). Since the listener knows what value it is listening to, it can just easily get the current value for the observable value as easily as it is passed as an argument (wrapped in a change event). This mechanism is similar to the standard mechanism in java.beans.PropertyChangeSupport, but since we know that we deal with very simple values and observers, we can make the equality test and notification mechanism much more efficient. Therefore, there is no need for any PropertyChangeEvents, and there is no need to extract and compare the native values from the event.

To maximize performance where many listeners are registered for a value, the listeners are grouped by an identifier: groupId in ObservableValue 213. The groupId is typically a UI control; when the UI control is disposed, all the listeners registered by this control can be detached by a single method call. The identifier groupId allows all the listeners in a group to be removed in one go rather than one by one. In ObservableValue 213, clear(groupId:Object) removes the listeners grouped by the identifier of groupId.

ObservableValue 213 holds a key used to register a value in the cache of ObservableUpdater 211. In ObservableValue 213, updaterKey keeps the reference in the cache alive as long as the value has at least one registered listener.

In the exemplary embodiment shown in FIG. 2, getValue( ) in ObservableValue 213 is, according to Java Bean standard, a standard getter that reads a value from the field: ObservableValue.value and it returns the value as a native datatype (e.g. int). In ObservableValue 213, setValue( ) is, according to Java Bean standard, a standard setter that writes a value to the field: ObservableValue.value. In ObservableValue 213, addListener( ) enables listeners to listen to changes of the distinct values. The method valueChange( ) in ValueListener 217 is used by the ObservableValue 213 to inform one or more listeners that a specific internal (native) value has changed.

Figure 3:
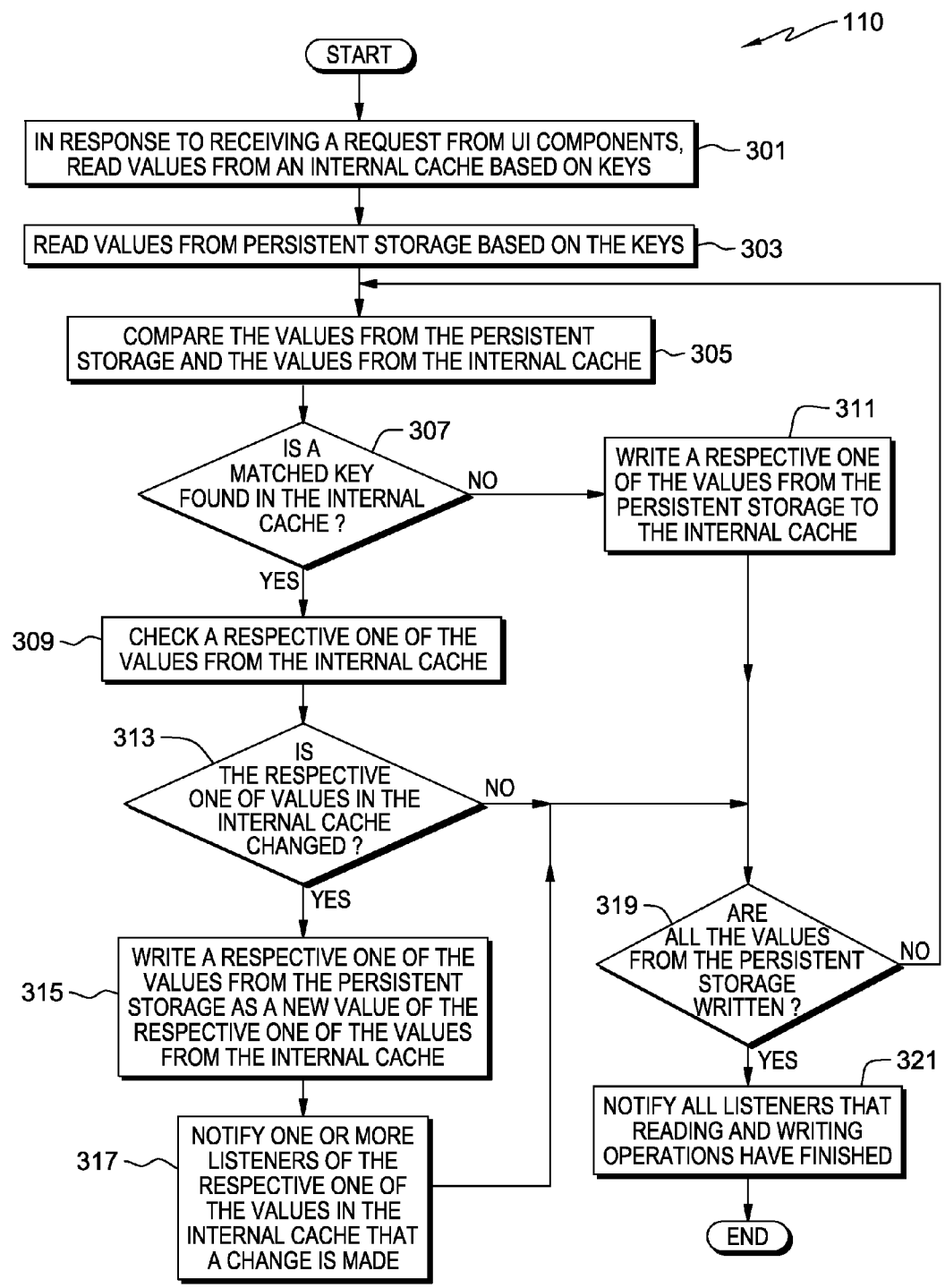
FIG. 3 is a flowchart illustrating operational steps of updating observable values for multiple user-interface components, in accordance with an exemplary embodiment of the present invention.

FIG. 3 is a flowchart illustrating operational steps of updating observable values for multiple user-interface components, in accordance with an exemplary embodiment of the present invention. The operating steps are implemented by value update program 110 shown in FIG. 1. At step 301, in response to receiving a request from multiple UI components 130, value update program 110 reads values from an internal cache based on keys. Each of the values from the internal cache is indexed by an arbitrary key. This step is done by getObservableValue( ) in ObservableUpdater 211 shown in FIG. 2. The internal cache is first loaded when ObservableUpdater 211 is requested to load data for some keys. In the next steps, the internal cache is updated whenever more data is loaded or when existing data is changed. At step 303, value update program 110 reads values from persistent storage 120 (shown in FIG. 1) based on the same keys. This is done by load( ) in ObservableUpdater 211 shown in FIG. 2.

At step 305, value update program 110 compares the values from the persistent storage 120 and the values from the internal cache. At decision block 307, value update program 110 determines whether a matched key is found in the internal cache. In response to determining that the matched key is not found in the internal cache (NO branch of decision block 307), value update program 110, at step 311, write a respective one of the values from the persistent storage to the internal cache. At this step, value update program 110 wraps the value whose key is not found in the internal cache and adds it into the internal cache. Because no listeners have been registered for the value whose key is not found in the internal cache, value update program 110 does not fire any event.

In response to determining that the matched key is found in the internal cache (YES branch of decision block 307), value update program 110, at step 309, checks a respective one of the values from the internal cache. At decision block 313, value update program 110 determines whether the respective one of the values in the internal cache has been changed. In response to determining that the respective one of the values in the internal cache has been changed (YES branch of decision block 313), at step 315, value update program 110 writes the respective one of the values from persistent storage 120 to the internal cache. In this exemplary embodiment, this is done by setValue( ) in ObservableValue 213 of value update program 110.

Value update program 110, at step 317, notifies one or more listeners of the respective one of the values in the internal cache that a change is made. Here, value update program 110 gives interested parties (e.g. grids showing the cached values) an option to act on the changes of individual values (typically to update the UI component).

After step 311, step 317, or in response to determining that the respective one of the values in the internal cache has not been changed (NO branch of decision block 313), value update program 110, at decision block 319, determines whether value update program 110 has written all values from persistent storage 120 to the internal cache.

In response to determining that value update program 110 has not written all values from persistent storage 120 to the internal cache (NO branch of decision block 319), value update program 110 goes back to step 305.

In response to determining that value update program 110 has written all values from persistent storage 120 to the internal cache (YES branch of decision block 319), value update program 110 notifies, at step 321, all listeners that read and writing operations have finished. Here, value update program 110 gives interested parties (e.g. grids showing the cached values) an option to act on the read/write events and fetch all interesting values (e.g. the cached values shown in grids) in one call when ObservableUpdater 211 has made changes of the values. Thus, multiple UI components 130 that have requested the values register themselves as listeners for the values in the internal cache.

Figure 4:
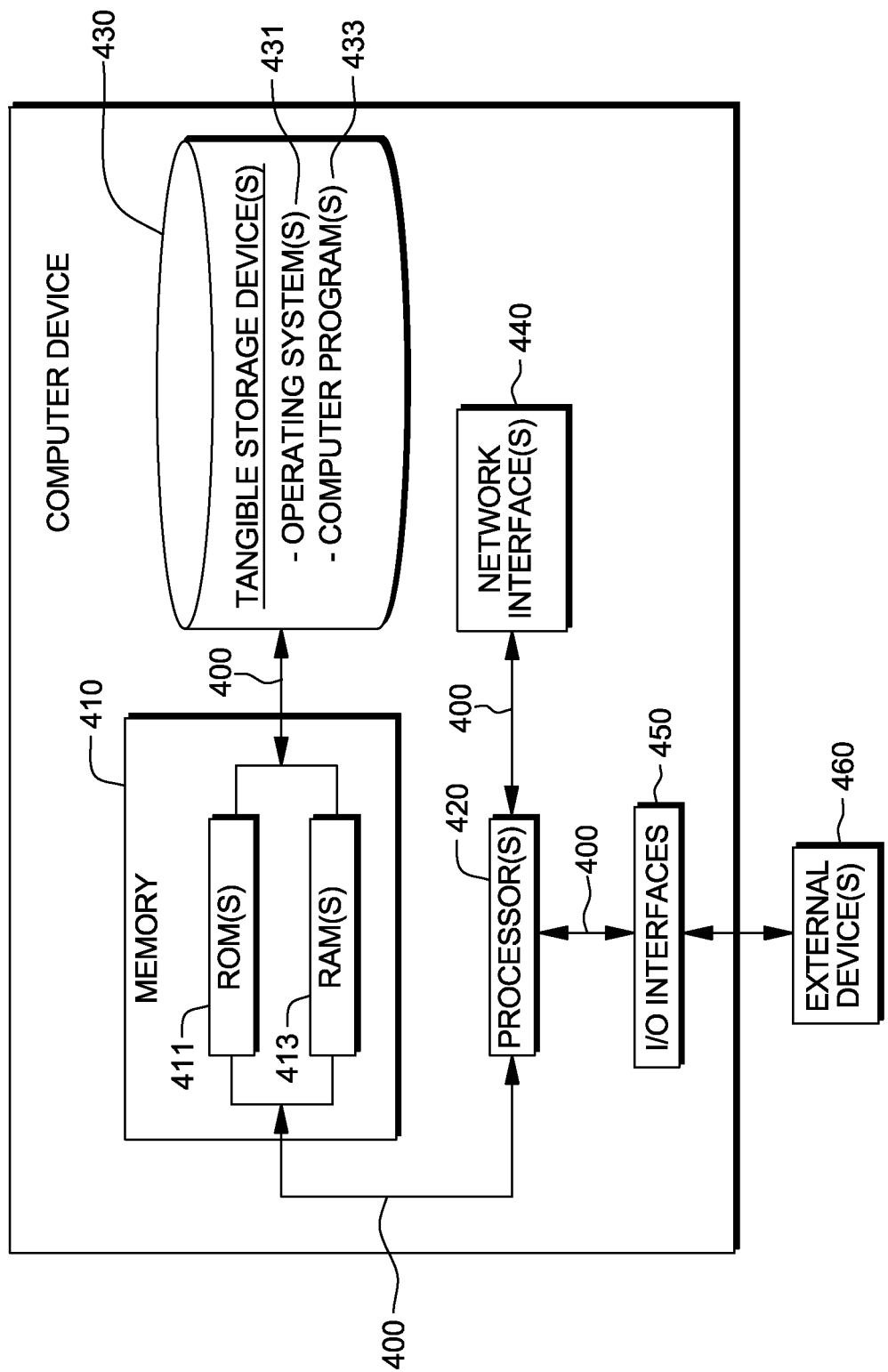
FIG. 4 is a diagram of components of a computer device hosting a value update program shown in FIGS. 1 and 2, in accordance with an exemplary embodiment of the present invention.

FIG. 4 is a diagram of components of a computer device hosting value update program 110 shown in FIGS. 1 and 2, in accordance with an exemplary embodiment of the present invention. It should be appreciated that FIG. 4 provides only an illustration of one implementation and does not imply any limitations with regard to the environment in which different embodiments may be implemented.

Referring to FIG. 4, the computer device includes communications fabric 400 which provides communications among processor(s) 420, memory 410, tangible storage device(s) 430, network interface(s) 440, and I/O (input/output) interface(s) 450. Memory 410 includes ROM(s) (Read Only Memory) 411 and RAM(s) (Random Access Memory) 413.

One or more operating system(s) 431 and one or more computer program(s) 433 reside on one or more computer-readable tangible storage device(s) 430. In the exemplary embodiment, value update program 110 shown in FIG. 1 resides on one or more computer-readable tangible storage device(s) 430 of the computer device, and in RAM(s) 413. In the exemplary embodiment, persistent storage 120 shown in FIG. 1 is computer-readable tangible storage device(s) 430 of the computer device.

The computer device further includes I/O interface(s) 450. I/O interface(s) 450 allow for input and output of data with external device(s) 460 that may be connected to the computer device. The computer device further includes network interface(s) 440 for communications between the computer device and a computer network.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for updating observable values for multiple user-interface components, the method implemented by a computer system, the method comprising:
   reading first values from a cache, in response to receiving a request from the user-interface components, the first values indexed by keys;
   reading second values from persistent storage, the second values indexed by the keys;
   comparing the first values and the second values based on the keys;
   writing to the cache the second values as new values of the first values;
   notifying one or more observers for respective ones of the first values, wherein the respective ones of the first values are changed; and
   notifying the one or more observers for the first values that reading and writing operations are finished.

2. The method of claim 1, wherein the computer system comprises a computer program comprising a first class for updating the first values in the cache, a second class each instance thereof wrapping one of the first values, a first observer interface of the first class, and a second observer interface of the second class.

3. The method of claim 2, wherein the first class and the second class have a composition relationship, the first class associates with multiple instances of the second class, wherein the first class, through the first observer interface, notifies the one or more observers for the first values, and wherein the second class, through the second observer interface, notifies the one or more observers for the respective ones of the first values.

4. The method of claim 1, further comprising:
   writing to the cache the second values as the first values in the cache, in response to determining that the first values are not present in the cache.

5. The method of claim 1, further comprising:
   registering the one or more observers, in response to that read and write operations are finished.

6. The method of claim 1, further comprising:
   removing one or more observers for a respective one of the first values, in response to that the one or more observers for a respective one of the first values request to be removed; and
   removing the respective one of the first values from the cache when a last one of the one or more observers is removed.

7. The method of claim 1, further comprising:
   grouping one or more observers for a respective one of the first values, wherein the one or more observers for the respective one of the first values are in a group with an identifier.

8. A computer program product for updating observable values for multiple user-interface components, the computer program product comprising:
   one or more computer-readable tangible storage devices and program instructions stored on at least one of the one or more computer-readable tangible storage devices, the program instructions comprising:
   program instructions to read first values from a cache, in response to receiving a request from the user-interface components, the first values indexed by keys;
   program instructions to read second values from persistent storage, the second values indexed by the keys;
   program instructions to compare the first values and the second values based on the keys;
   program instructions to write to the cache the second values as new values of the first values;
   program instructions to notify one or more observers for respective ones of the first values, wherein the respective ones of the first values are changed; and
   program instructions to notify the one or more observers for the first values that reading and writing operations are finished.

9. The computer program product of claim 8, wherein the computer system comprises a computer program comprising a first class for updating the first values in the cache, a second class each instance thereof wrapping one of the first values, a first observer interface of the first class, and a second observer interface of the second class.

10. The computer program product of claim 9, wherein the first class and the second class have a composition relationship, the first class associates with multiple instances of the second class, wherein the first class, through the first observer interface, notifies the observers for the first values, and wherein the second class, through the second observer interface, notifies the one or more observers for the respective ones of the first values.

11. The computer program product of claim 8, further comprising:
   program instructions to write to the cache the second values as the first values in the cache, in response to determining that the first values are not present in the cache.

12. The computer program product of claim 8, further comprising:
   program instructions to register the observers, in response to that read and write operations are finished.

13. The computer program product of claim 8, further comprising:
   program instructions to remove one or more observers for a respective one of the first values, in response to that the one or more observers for a respective one of the first values request to be removed; and
   program instructions to remove the respective one of the first values from the cache when a last one of the one or more observers is removed.

14. The computer program product of claim 8, further comprising:
program instructions to group one or more observers for a respective one of the first values, wherein the one or more observers for the respective one of the first values are in a group with an identifier.

15. A computer system for updating observable values for multiple user-interface components, the computer system comprising:
one or more processors, one or more computer-readable tangible storage devices, and program instructions stored on at least one of the one or more computer-readable tangible storage devices for execution by at least one of the one or more processors, the program instructions comprising:
program instructions to read first values from a cache, in response to receiving a request from the user-interface components, the first values indexed by keys;
program instructions to read second values from persistent storage, the second values indexed by the keys;
program instructions to compare the first values and the second values based on the keys;
program instructions to write to the cache the second values as new values of the first values;
program instructions to notify one or more observers for respective ones of the first values, wherein the respective ones of the first values are changed; and
program instructions to notify the one or more observers for the first values that reading and writing operations are finished.

16. The computer system of claim 15, wherein the computer system comprises a computer program comprising a first class for updating the first values in the cache, a second class each instance thereof wrapping one of the first values, a first observer interface of the first class, and a second observer interface of the second class, wherein the first class and the second class have a composition relationship, the first class associates with multiple instances of the second class, wherein the first class, through the first observer interface, notifies the one or more observers for the first values, and wherein the second class, through the second observer interface, notifies the one or more observers for the respective ones of the first values.

17. The computer system of claim 15, further comprising:
program instructions to write to the cache the second values as the first values in the cache, in response to determining that the first values are not present in the cache.

18. The computer system of claim 15, further comprising:
program instructions to register the one or more observers, in response to that read and write operations are finished.

19. The computer system of claim 15, further comprising:
program instructions to remove one or more observers for a respective one of the first values, in response to that the one or more observers for a respective one of the first values request to be removed; and
program instructions to remove the respective one of the first values from the cache when a last one of the one or more observers is removed.

20. The computer system of claim 15, further comprising:
program instructions to group one or more observers for a respective one of the first values, wherein the one or more observers for the respective one of the first values are in a group with an identifier.

* * * * *